(12) United States Patent
Capelle

(10) Patent No.: US 6,502,977 B1
(45) Date of Patent: Jan. 7, 2003

(54) EXTRUDER PLANT WITH WORM EXTRUDER AND GEARWHEEL EXTRUDER

(75) Inventor: Gerd Capelle, Langenhagen (DE)

(73) Assignee: Atecs Mannesmann AG, Düsseldorf (DE)

( * ) Notice: Subject to any disclaimer, the term of this patent is extended or adjusted under 35 U.S.C. 154(b) by 0 days.

(21) Appl. No.: 09/653,632

(22) Filed: Sep. 1, 2000

(30) Foreign Application Priority Data

Sep. 3, 1999 (DE) .......................... 199 43 738

(51) Int. Cl.⁷ ................................ B29B 7/74
(52) U.S. Cl. .................... 366/77; 366/91; 366/100; 425/205; 425/207; 425/209
(58) Field of Search ................ 366/91, 77, 79, 366/83–86, 100, 76.3, 76.5, 76.4, 76.1; 425/201, 202, 205, 206, 208, 209

(56) References Cited

U.S. PATENT DOCUMENTS

| | | | | |
|---|---|---|---|---|
| 1,595,470 A | * | 8/1926 | Johnson | |
| 2,680,880 A | * | 6/1954 | Corbett | |
| 2,692,405 A | * | 10/1954 | Gayler | |
| 2,767,437 A | * | 10/1956 | Marshall | 425/205 |
| 3,130,448 A | * | 4/1964 | Tomlinson | 425/208 |
| 3,649,147 A | * | 3/1972 | Fritsch | 425/207 |
| 3,694,120 A | * | 9/1972 | Walton | |
| 3,737,506 A | * | 6/1973 | Martin et al. | |
| 3,754,735 A | * | 8/1973 | Hoyle et al. | |
| 3,991,153 A | * | 11/1976 | Klausner et al. | 425/208 |
| 4,013,745 A | * | 3/1977 | Brinkmann et al. | |
| 4,137,023 A | * | 1/1979 | Moked et al. | |
| 4,171,193 A | * | 10/1979 | Rahlfs | |
| 4,212,543 A | * | 7/1980 | Bersano | 366/85 |
| 4,310,251 A | * | 1/1982 | Scharer et al. | 366/77 |
| 4,452,750 A | * | 6/1984 | Handwerk et al. | |
| 4,501,498 A | * | 2/1985 | Mckelvey | |
| 4,663,103 A | * | 5/1987 | McCullough et al. | 366/85 |
| 4,707,139 A | * | 11/1987 | Valenzky et al. | 366/77 |
| 4,721,589 A | * | 1/1988 | Harris | |
| 4,890,996 A | * | 1/1990 | Shimizu | 366/83 |
| 4,902,455 A | * | 2/1990 | Wobbe | |
| 4,963,309 A | * | 10/1990 | Gohlisch et al. | |
| 5,048,405 A | * | 9/1991 | Takahashi et al. | 366/77 |
| 5,122,315 A | * | 6/1992 | Darley | |
| 5,143,448 A | * | 9/1992 | Ueda et al. | 366/77 |
| 5,153,009 A | * | 10/1992 | Boigt | 366/77 |
| 5,156,781 A | * | 10/1992 | Sohm et al. | |
| 5,179,521 A | * | 1/1993 | Edge | 366/77 |
| 5,191,537 A | * | 3/1993 | Edge | 366/77 |
| 5,267,847 A | * | 12/1993 | Bohm et al. | 366/77 |
| 5,304,053 A | * | 4/1994 | Gohlisch et al. | 366/91 |
| 5,310,256 A | * | 5/1994 | Boden | 366/77 |
| 5,378,415 A | * | 1/1995 | Gohlisch et al. | 366/77 |
| 5,433,593 A | * | 7/1995 | Berger | 366/77 |
| 5,462,426 A | * | 10/1995 | Imamura | 366/77 |
| 5,816,700 A | * | 10/1998 | Starke, Sr. et al. | 425/209 |
| 5,829,872 A | * | 11/1998 | Mizuguchi et al. | 366/77 |
| 5,855,927 A | * | 1/1999 | Uth et al. | 366/76.1 |
| 5,890,801 A | * | 4/1999 | Mizuguchi et al. | 366/77 |

FOREIGN PATENT DOCUMENTS

| | | |
|---|---|---|
| DE | 27 00 003 | 7/1978 |
| DE | 41 11 217 | 7/1992 |
| DE | 196 52 924 | 1/1998 |

\* cited by examiner

*Primary Examiner*—Tony G. Soohoo
(74) *Attorney, Agent, or Firm*—Cohen, Pontani, Lieberman & Pavane

(57) ABSTRACT

An extruder plant includes a worm extruder having a reduced length and including only a feed zone of the extruder plant and a gearwheel extruder connected downstream of the worm extruder and including a plasticizing and pressure build-up zone of the extruder plant.

14 Claims, 5 Drawing Sheets

EXTRUDER PLANT WITH WORM EXTRUDER AND GEARWHEEL EXTRUDER

BACKGROUND OF THE INVENTION

1. Field of the Invention

The present invention relates to an extruder plant for processing rubber mixtures or thermoplastics which includes a feed zone, a plasticizing zone and a pressure build-up zone. The extruder plant is equipped with a worm extruder and with a gearwheel extruder connected to the worm extruder downstream in the extruding direction and to which an extruding die for shaping the extrudate is capable of being connected.

2. Description of the Related Art

Rubber mixtures for the production of rubber products or thermoplastics are processed predominantly by worm extruders which typically comprise 1-worm or 2-worm extruders. Such extruders usually have three zones arranged in succession, the three zones comprising a feed zone for the supply of material, a plasticizing zone connected to the feed zone for converting the material supplied into the plastic state under the action of pressure and heat, and a pressure build-up zone which applies the necessary pressure for conveying the plasticized material through the extruding die used in each case for shaping the product.

Experience has shown that a worm assembly is not particularly suited for generating high static pressures because it has relatively low pump efficiency. Accordingly, the drive energy supplied in the pressure build-up zone is converted predominantly into heat and therefore often has to be discharged by cooling devices to avoid product damage due to overheating. This is undesirable in view of both the plant outlay and also the operational outlay.

A gearwheel pump has about three times as high a pump efficiency for the static pressure build-up compared to a worm gear. Appropriate extruder plants are known (for example in German reference DE 41 11 217 C1) which combine with one another the good properties of the worm extruder as a plasticizing device and the particular suitability of the gearwheel pump for generating high static pressures. In such plants, the outlet of the worm extruder is connected directly to the inlet of a gearwheel pump such that high extrusion pressures is generated with high efficiency. At the same time, there is the particular advantage that the extrusion pressure fluctuation (pulsation), which can often be detected in a worm extruder and is unfavorable for the product quality, is compensated as far as possible. One disadvantage of these plants, however, is the high plant outlay required for the worm extruder and the gearwheel pump.

It is also known to use a gearwheel pump itself as an assembly for plasticizing rubber mixtures. These plants dispense completely with a worm extruder. Such pump assemblies are therefore also designated as gearwheel extruders. It is important in these plants that the toothed spaces in the region of the conveying zone of the gearwheel extruder are always filled as completely as possible with the material to be processed to avoid air inclusions in the extrudate. The raw material must therefore be conveyed at a particular admission pressure uniformly into the gusset region of the gearwheels on the inlet side of the gearwheel extruder. For this purpose, for example, German reference DE 196 52 924 A1 discloses the use of so-called feed rollers which each consist of a pair of rollers running in opposite directions. The raw material is introduced through the nip of the rollers in the form of material strips, so that it is picked up by the rollers and fed under admission pressure into the gearwheel extruder.

However, the operation of feed rollers of this type presents extraordinary problems. More specifically, the operation of these feed rollers requires a very high degree of uniformity with regard to the supply of the raw material in the form of feed strips. The feed strips must have a constant cross section along the longitudinal direction, that is to say a constant thickness and width, so that neither temporary "overfeeding" nor "underfeeding" occurs with the feed rollers rotating at a constant rotational speed. Underfeeding leads to undesirable air inclusions, while overfeeding causes operating faults at the feed rollers because the excess material leads to the rollers being wound around and smeared with raw material and to the feed strip breaking off. The feed rollers must therefore be monitored in a particular way during operation which requires an undesirably high outlay in terms of personnel involved for this purpose.

SUMMARY OF THE INVENTION

The object of the present invention is to provice an extruder plant which avoids the disadvantages of the prior art along with a low outlay in operational and structural terms and allows particularly reliable operation with as uniform an extrusion pressure as possible.

This object is achieved according to an embodiment of the present invention by an extruder plant for processing rubber mixtures and thermoplastics including a feed zone, a plasticizing zone and a pressure build-up zone, comprising a short extruder comprising a worm extruder having a reduced length and including only said feed zone of said extruder plant, and a gear-wheel extruder connected downstream of said worm extruder in an extruding direction and forming said plasticizing zone and pressure build-up zones, said gearwheel extruder having a downstream end connectable to an extruding die.

According to the present invention, a a worm extruder is connected to a gearwheel extruder in a series connection such that the gearwheel extruder simultaneously plasticizes the material and generates the static pressure while the worm extruder merely supplies the material. The worm extruder in the present invention is restricted in its overall length merely to the feed zone of a conventional worm extruder. That is, the worm extruder does not itself have any plasticizing zone. This type of extruder, which is designated hereafter as a short extruder, requires only a low structural outlay because the short extruder is not equipped with heating or cooling equipment.

The short extruder is a highly robust material draw-in assembly which can be fed with any desired physical embodiments of the raw material to be supplied. Accordingly, any type of raw material may be supplied including strip-like materials, the uniformity of which is no longer of any importance, granulates and even so-called puppets (rolls produced from strip-like material and having a diameter of, for example, 100 mm). The extruder plant according to the present invention may be used for processing high-viscosity materials such as, for example, rubber mixtures and thermoplastics. Furthermore, the inventive extruder plant is extremely simple to control and regulate.

To further reduce plant outlay, the short extruder and the gearwheel extruder may be driven by a common motor. In principle, the motor may comprise any desired type of motor but it is preferably designed as an electric motor. This simplification of the drive is readily possible because experience has revealed that the ratio of the necessary rotational speeds of the two extruders remains substantially constant for most materials over a wide range of rotational speeds. There are very few materials for which it is necessary to adapt the rotational speeds to optimal values at which the rotational speed ratio changes. Experience has shown that the range of variation is approximately from 1:1 to 1:0.9.

Two separate gears are respectively used for driving the gearwheel extruder and the short extruder. One of the two gears is connected to the common drive motor via a coupling and has a first output shaft for driving one of the two gears for one of the extruders and a second output shaft for power transmission that is drive-coupled to the drive shaft of the other of the two gears. In a preferred embodiment, the gear of the worm extruder is directly connected to the drive motor via a coupling. A drive coupling may be used to connect the two gears to one another. The drive coupling may comprise a belt mechanism which preferably comprises a toothed-belt to avoid slip but which may also comprise a V-belt. If required, the rotational speed ratio may be adjusted in a drive coupling comprising a toothed-belt without high outlay, by exchanging at least one of the toothed-belt pulleys with another toothed-belt pulley with a correspondingly changed diameter. If there is no requirement for changing the setting of the rotational speed on the two extruders, the drive coupling may also comprise, for example, a cardan shaft. In applications which require frequent changes of the rotational speed ratio during operation because of, for example, relatively frequent changes between materials for which the rotational speed ratios are critical, an intermediate gear with a continuously variable transmission ratio such as a Positively Infinitely Variable (PIV) gear is preferably used for the drive coupling of the two gears.

In a preferred embodiment, the two gears comprise spur gears. The one of the two gears that has two output shafts has a bevel gear stage for branching the power to the second output shaft. The bevel gear stage is preferably arranged on the drive shaft.

The short extruder comprises a feed funnel for introducing the raw material to the short extruder. The feed funnel allows the processing of materials having a wide variety of physical consistencies including granulate, feed strip, or puppet form. If the raw material is a feed strip or is in puppet form, the feed funnel may be equipped simple feed rollers which may be motively driven if required.

The short extruder may, for example, comprise a 1-worm extruder or a 2-worm extruder. A 1-worm extruder is suitable primarily for the processing of rubber while a 2-worm extruder is suitable for processing both rubber and plastic.

Various types of gearwheels may be used for the gearwheel extruder. For example, the gearwheels may comprise spurs or helical toothing. However, gearwheels with herringbone toothing are particularly preferred because they are distinguished by particularly good synchronism and by the compensation of axial forces during torque transmission.

Heating appliances are provided for the thermal control of the gearwheel extruder. The heating appliances are preferably of a container-like design and are arranged redundantly. Accordingly, in the event of a fault, a rapid changeover and easy exchange without any appreciable interruption in operation are possible. According to the present invention, the gearwheel extruder and the short extruder are mounted together with the two gears on a table-like machine stand and the heating appliances may be arranged below the table-like machine stand for a space-saving installation.

The driving and heating control of the entire extruder plant may therefore be managed by an electronic control.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
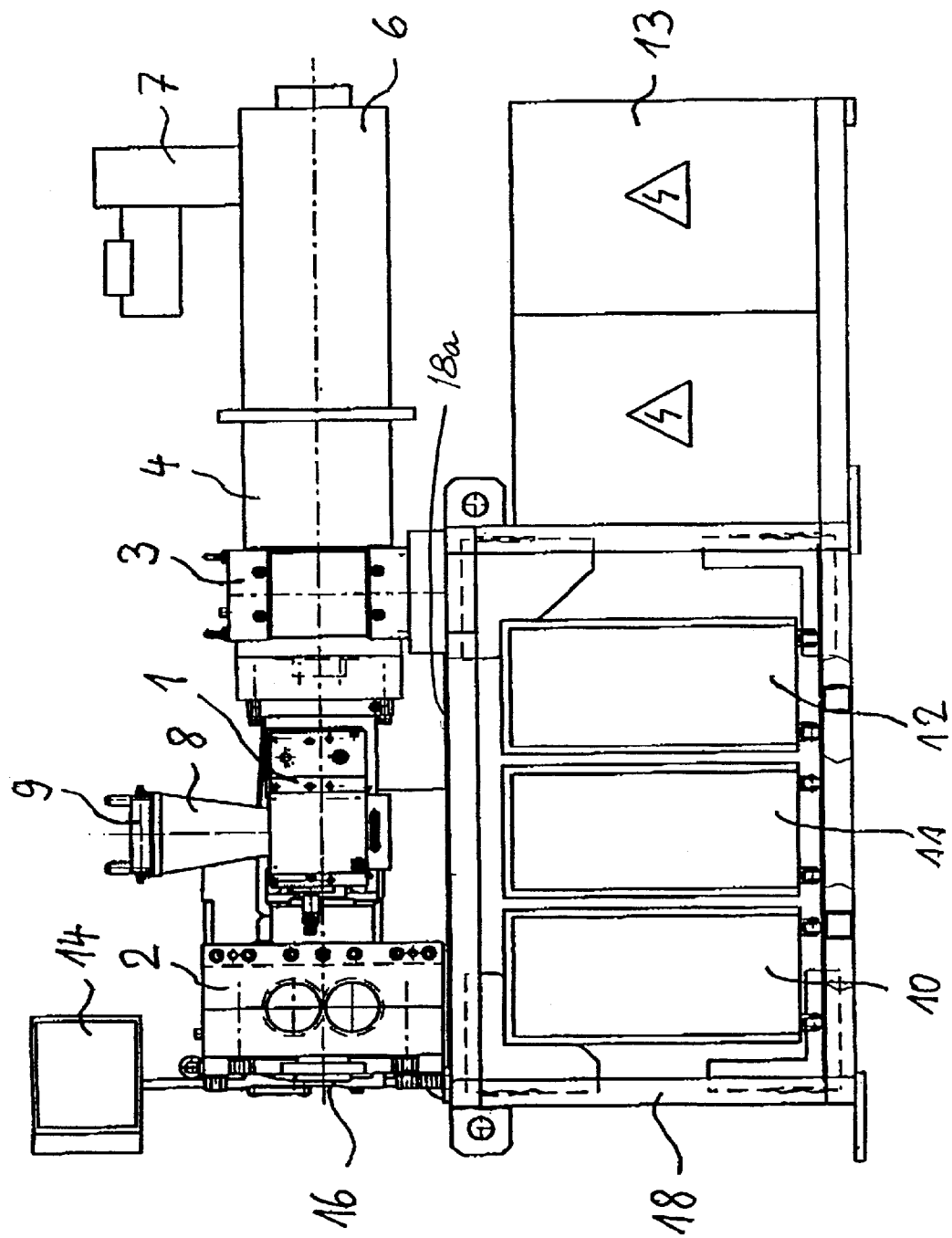
FIG. 1 is a side view of an extruder plant according to an embodiment of the present invention.
Figure 2:
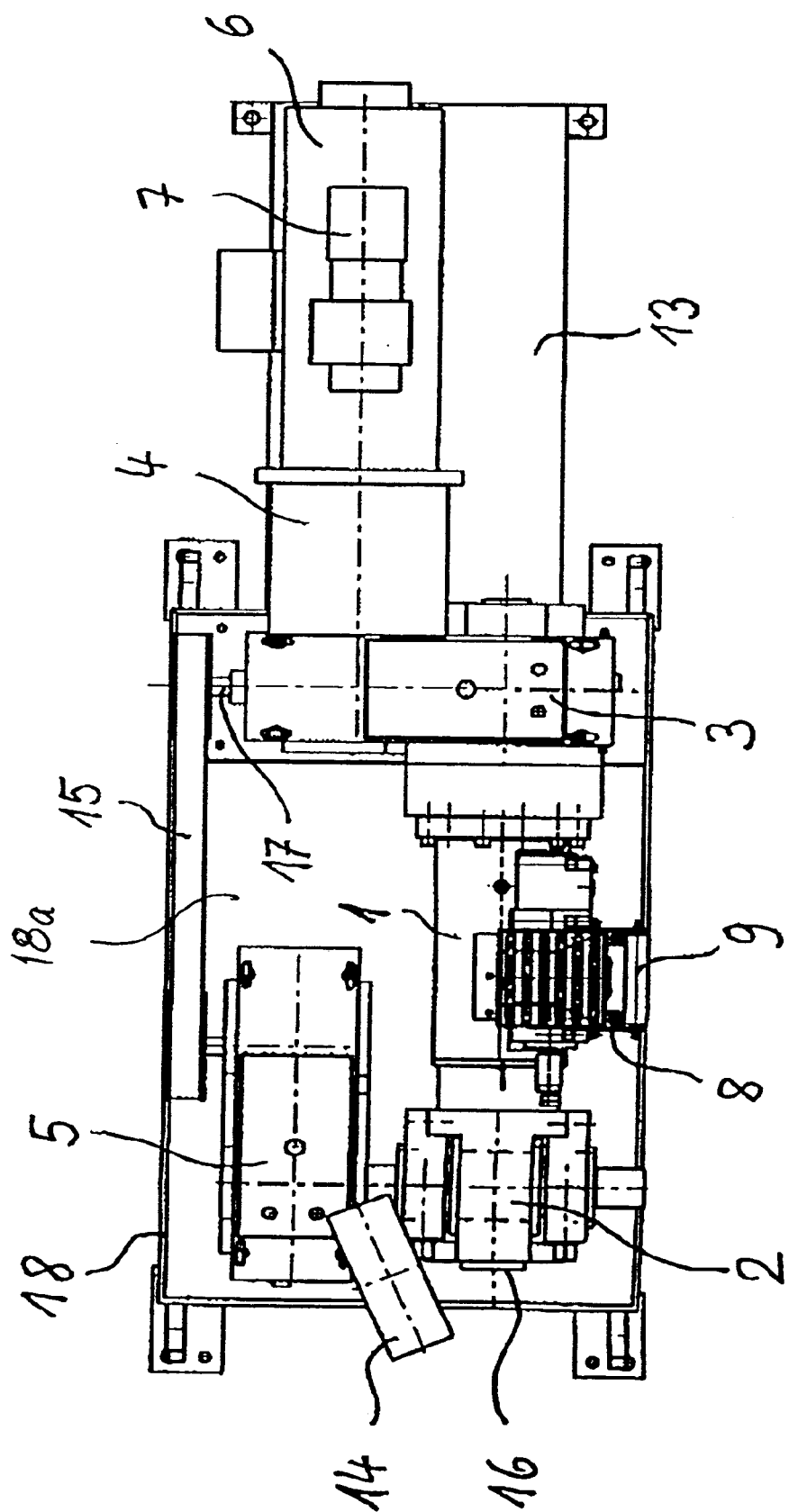
FIG. 2 is a top view of the extruder plant in FIG. 1.
Figure 3:
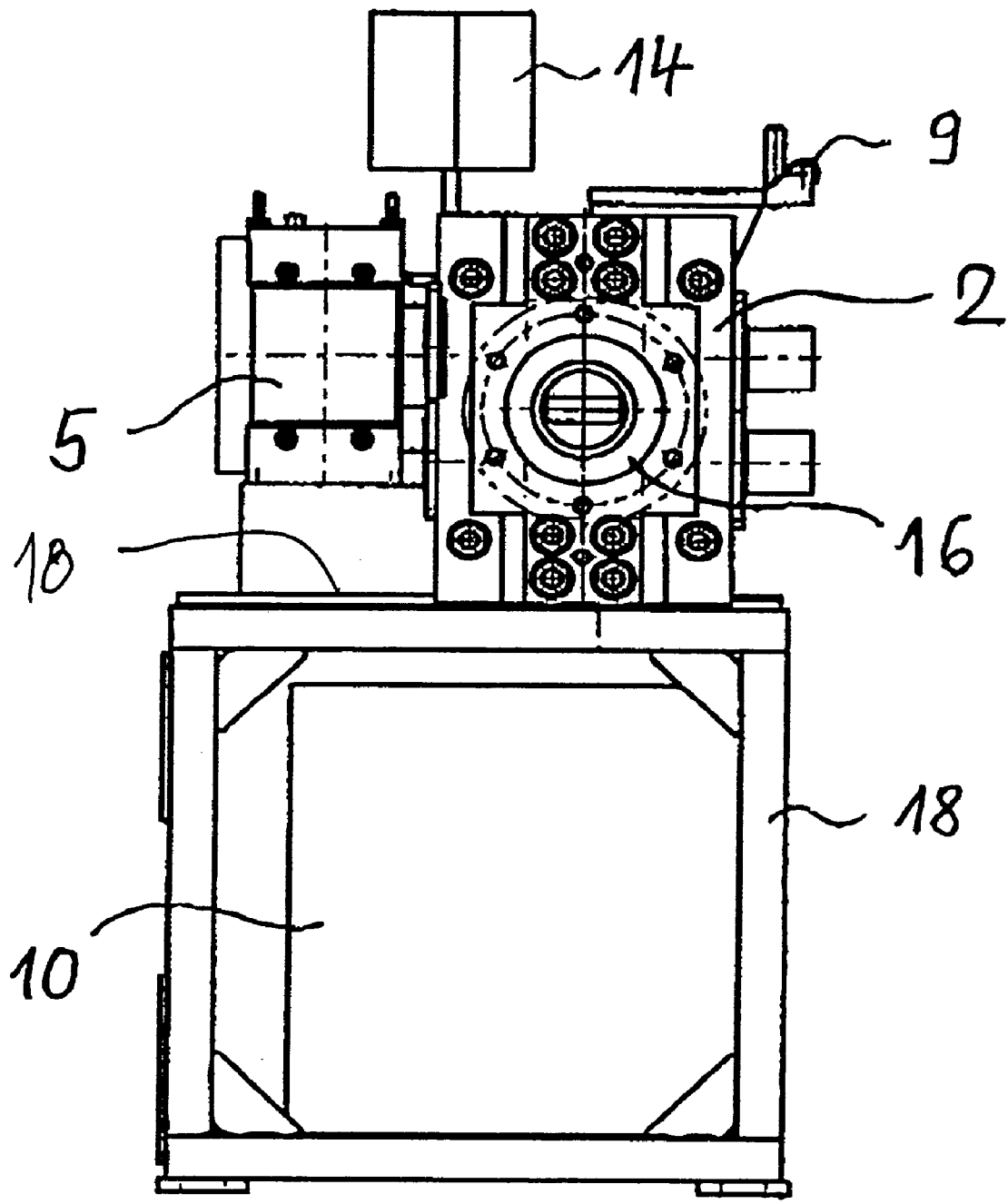
FIG. 3 is a front view of the extruder plant in FIG. 1.

An extruder plant according to an embodiment of the present invention is depicted in FIGS. 1–3. The extruder plant comprises a 2-worm extruder designed as a short extruder 1 and a gearwheel extruder 2 connected directly to the short extruder 1 in the material flow direction for processing of rubber and/or thermoplastic materials. The short extruder 1 comprises a draw-in zone of a conventional worm extruder and does not include any heating and cooling equipment. Instead of a 2-worm extruder, the short extruder 1 may alternatively comprise a 1-worm extruder. The short extruder 1 comprises a feed tunner 8 for feeding the material to be processed. The feed tunnel 8 comprises driven feed rollers 9 to assist the draw-in of feed strips or puppets. The driven feed rollers 9 are not provided when granulate is used as raw material. The short extruder 1 is connected to a first gear 3. An electric motor 6 is connected to the gear 3 via a coupling 4 for driving the first gear 3 and short extruder 1. A fan 7 is arranged on the motor 6 for subjecting the motor to cooling air. The first gear 3 comprises two output shafts including a first output shaft 17 and a second output shaft (not illustrated) connected for driving the short extruder 1. The output shaft 17 is connected to a toothed-belt pulley of a toothed-belt mechanism 15.

A second gear 5 is connected for driving the gearwheel extruder 2. The second gear 5 is drive-connected to the first gear 3 via the toothed-belt mechanism 15 and is therefore also driven by the motor 6. The gearwheel extruder 2 comprises a connection 16 on a delivery side of the gearwheel extruder for attaching an extrusion die which is not illustrated.

Figure 2A:
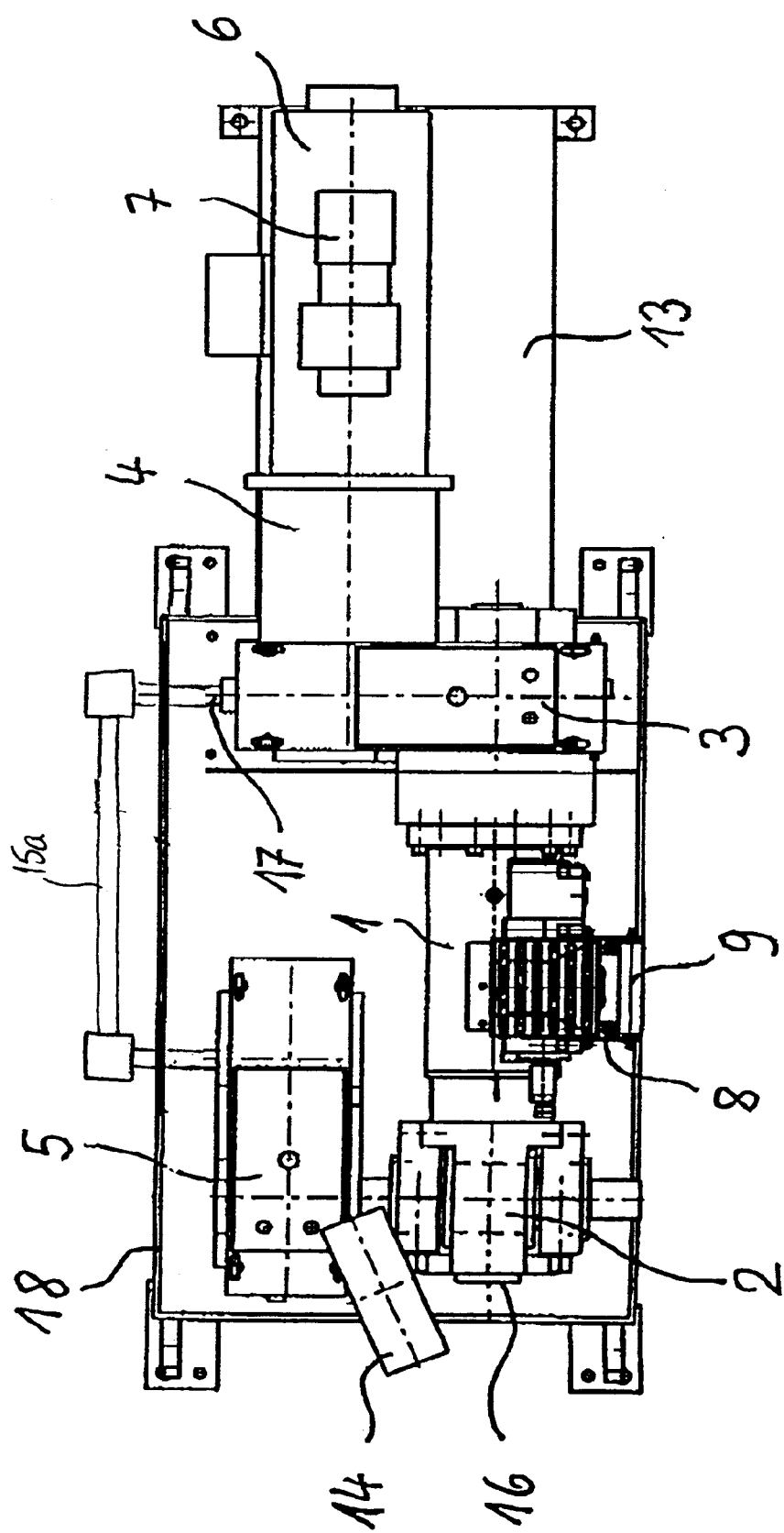
FIG. 2a is a top view of another embodiment of an extruder plant according to the present invention.
Figure 2B:
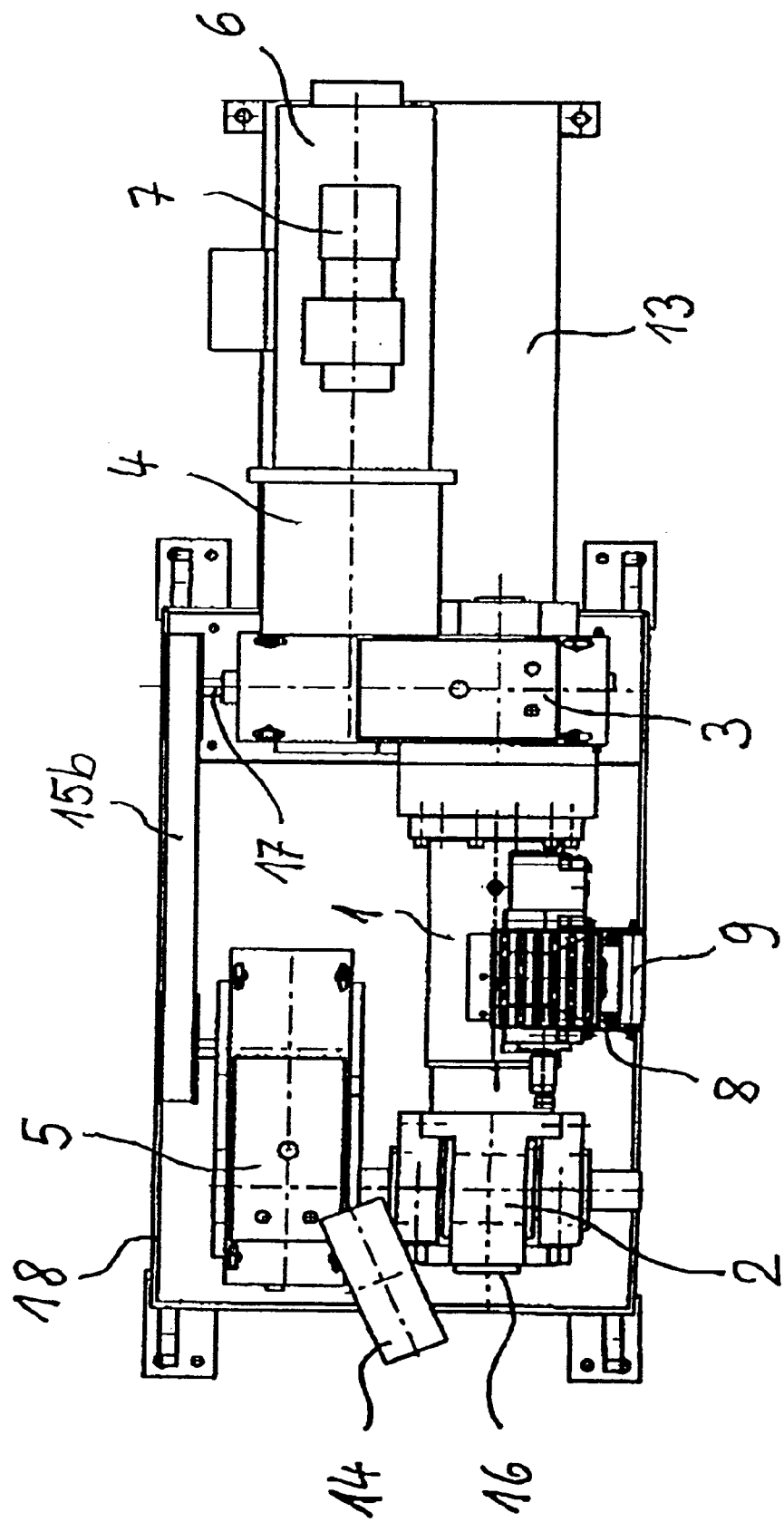
FIG. 2b is a top view of yet another embodiment of an extruder plant according to the present invention.

Instead of a toothed-belt mechanism 15, other driving mechanisms such as a cardan shaft 15a in FIG. 2a or a PIV gear 15b in FIG. 2b may be used. The PIV gear 15b is particularly useful when frequent changes of rotational speed ratios are required such as when frequent changes of materials for which the rotational speed ratios are critical.

Container-like heating appliances 10, 11, 12 are provided in a redundant design for the thermal control of the gearwheel extruder 2. The heating appliances 10, 11, 12 are installed on rollers so that they are easily exchangeable in the event of a fault. The gearwheel extruder 2, the short extruder 1, the first gear 3, the second gear 5, and the motor 6 flanged on via the coupling 4 are mounted on a table surface 18a of a table-like machine stand 18. Furthermore, the heating appliances 10, 11, 12 are arranged in a space-saving installation below the table surface 18a of the machine stand 18, that is to say below the two extruders. A switch cabinet 13 including electronics for the drive and the control electronics for the entire plant is arranged at a location directly adjoining the machine stand 18. As shown in FIG. 1, the switch cabinet is arranged below the motor 6 in a space-saving installation. Furthermore, a display screen 14 of the electronic control is arranged on the machine stand 18 proximate the delivery side of the gearwheel extruder 2, allowing setup and monitoring of the entire plant.

During operation of the plant, the raw material, i.e., in the form of feed strips, is conveyed via the feed funnel 8 into the short extruder 1 with the cooperation of the feed rollers 9 as a draw-in aid. The raw material supplied to the plant is picked up by the worm assembly of the short extruder 1 and is conveyed into the draw-in region of the gearwheel extruder 2 in a uniform conveying stream with a constant admission pressure being built up. As a result of this admission pressure, the toothed spaces of the gearwheel extruder are filled with the raw material in an optimal way without any undesirable air inclusions. The raw material is brought to a temperature required for plasticization under the action of pressure and temperature with the heat supplied from the heating devices 10, 11, 12 and the frictional heat occurring in the gearwheel extruder 2. The raw material is plasticized at the required temperature and then supplied at the necessary static pressure to the extrusion die. The gearwheel extruder 2 thus assumes both the task of plasticization and the task of increasing the pressure of the plasticized material. The rotational speeds of the gearwheel extruder 2 and of the short extruder 1 are in a constant ratio. The production output rate of the plant is adjustable by regulating the driving rotational speed of the motor 6. If it is necessary to adjust the rotational speed ratio of the gearwheel extruder 2 and short extruder 1 during the processing of materials for which the rotational speed is critical, the adjustment may be effected without high outlay by exchanging toothed-belt pulleys of the toothed-belt mechanism with corresponding pulleys of a changed diameter. Fluctuations in the supply of material to the feed funnel 8 are compensated easily by the short extruder 1, thereby ensuring high operating reliability for the entire extruder plant.

The extruder plant according to the present invention not only has possibilities for universal use with regard to the form of raw material capable of being processed (granulate, strip, puppet), but is also universally suitable with regard to the processing process itself. The plant may be operated as a strainer machine, as a preheating assembly or, in the way described, as an extrusion machine.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An extruder plant for processing rubber mixtures and thermoplastics including a feed zone, a plasticizing zone and a pressure build-up zone, comprising:
    a short extruder comprising a worm extruder having a reduced length in that said short extruder extends only said feed zone of said extruder plant;
    a gear-wheel extruder connected downstream of said worm extruder in an extruding direction and forming said plasticizing zone and pressure build-up zones of said extruder plant, said gearwheel extruder having a downstream end connectable to an extruding die; and
    a first gear drivably connected to said short extruder and a second gear drivably connected to said gearwheel extruder.

2. The extruder plant of claim 1, further comprising a common motor drivably connected to said first and second gears for driving said short extruder and said gearwheel extruder.

3. The extruder plant claim 2, further comprising a coupling connected between said motor and one of said first and second gears, wherein said one of said first and second gear drives the one of the short extruder and the gearwheel extruder associated with said one of said first and second gear drives and comprises an output shaft drive-coupled to the other one of said first and second gears.

4. The extruder plant of claim 3, further comprising a drive mechanism arranged for drive coupling said second gear of said gearwheel extruder to said first gear of said short extruder.

5. The extruder plant of claim 4, wherein said drive mechanism comprises one of a toothed-belt mechanism and a cardan shaft.

6. The extruder plant of claim 5, wherein said drive mechanism comprises a PIV gear.

7. The extruder plant of claim 2, wherein said motor comprises an electric motor.

8. The extruder plant of claim 2, further comprising a plurality of exchangeable container-like heating appliances arranged in a redundant design for thermally controlling said gearwheel extruder and an electronic control operatively connected for controlling a drive speed and temperature of said extruder plant.

9. The extruder plant of claim 1, wherein said short extruder comprises a feed funnel including a draw-in aid comprising feed rollers.

10. The extruder plant of claim 1, wherein said short extruder comprises a two-worm extruder.

11. The extruder plant of claim 1, further comprising a plurality of exchangeable container-like heating appliances arranged in a redundant design for heating said gearwheel extruder.

12. The extruder plant of claim 11, further comprising an electronic control operatively connected for controlling a drive speed and temperature of said extruder plant.

13. An extruder plant for processing rubber mixtures and thermoplastics including a feed zone, a plasticizing zone and a pressure build-up zone, comprising:
    a short extruder comprising a worm extruder having a reduced length in that said short extruder extends only said feed zone of said extruder plant;
    a gear-wheel extruder connected downstream of said worm extruder in an extruding direction and forming said plasticizing zone and pressure build-up zones of said extruder plant, said gearwheel extruder having a downstream end connectable to an extruding die;

a first gear drivably connected to said short extruder and a second gear drivably connected to said gearwheel extruder;

a plurality of exchangeable container-like heating appliances arranged in a redundant design for thermally controlling said gearwheel extruder; and a table-like machine stand having a table surface on which said gearwheel extruder, said short extruder, and said first and second gears are mounted, said heating appliances being mounted below said table surface.

14. An extruder plant for processing rubber mixtures and thermoplastics including a feed zone, a plasticizing zone and a pressure build-up zone, comprising:

a short extruder comprising a worm extruder having a reduced length in that said short extruder extends only said feed zone of said extruder plant;

a gear-wheel extruder connected downstream of said worm extruder in an extruding direction and forming said plasticizing zone and pressure build-up zones of said extruder plant, said gearwheel extruder having a downstream end connectable to an extruding die;

a plurality of exchangeable container-like heating appliances arranged in a redundant design for thermally controlling said gearwheel extruder;

an electronic control operatively connected for controlling a drive speed and temperature of said extruder plant; and a common motor drivably connected to said short extruder and said gearwheel extruder, wherein said electronic control is operatively connected to said motor and said heating appliances for controlling the drive speed and temperature of said extruder plant.

* * * * *